April 14, 1931. H. E. KEMPTON ET AL 1,800,540
WORK HOLDER
Filed Jan. 16, 1925
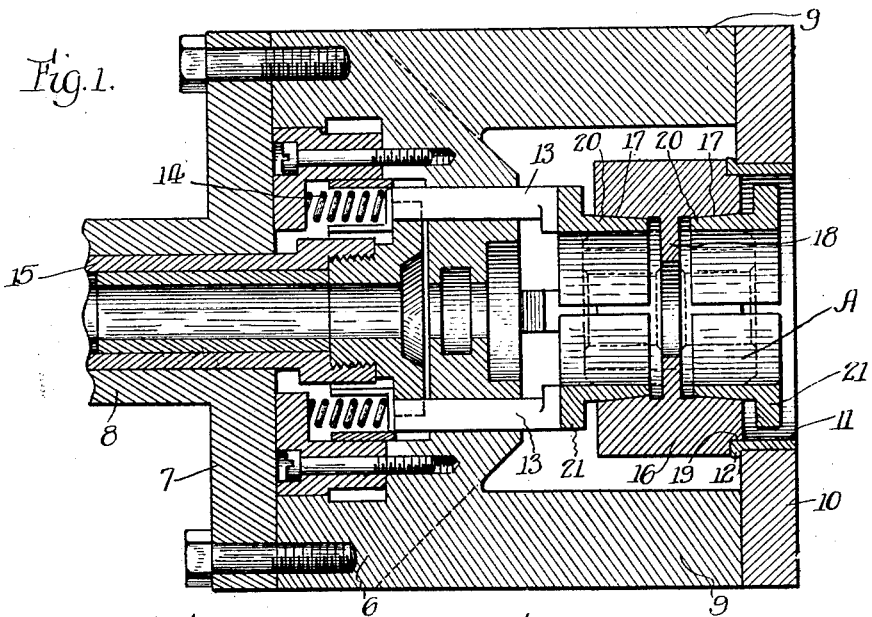
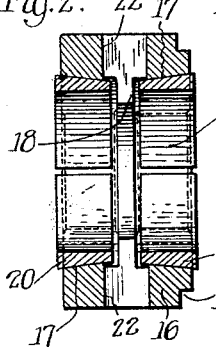
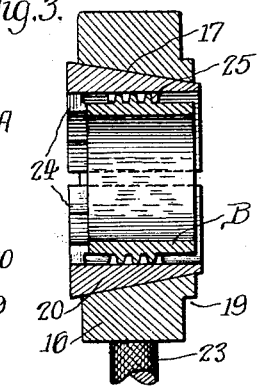
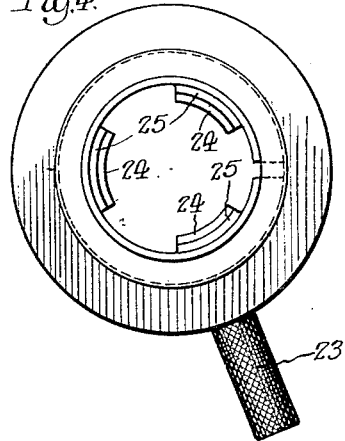
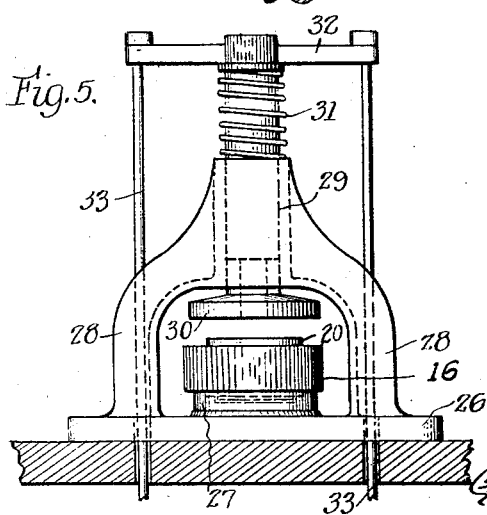
Inventors:
Herbert E. Kempton,
Keith F. Gallimore,
Raymond M. Woytych,
Attys.

Patented Apr. 14, 1931

1,800,540

UNITED STATES PATENT OFFICE

HERBERT E. KEMPTON, KEITH F. GALLIMORE, AND RAYMOND M. WOYTYCH, OF FOND DU LAC, WISCONSIN, ASSIGNORS, BY MESNE ASSIGNMENTS, TO THE HEALD MACHINE COMPANY, OF WORCESTER, MASSACHUSETTS, A CORPORATION OF MASSACHUSETTS

WORK HOLDER

Application filed January 16, 1925. Serial No. 2,775.

The present invention relates to improvements in workholders of the type illustrated in a copending application Serial No. 680,826, filed December 15, 1923 by Herbert E. Kempton and Keith F. Gallimore, and in our copending application, Serial No. 728,063, filed July 25, 1924.

The workholders disclosed in these copending applications are portable, and are adapted to be quickly and accurately mounted in a machine chuck. This construction permits one workholder or shuttle to be unloaded and reloaded while another is in the machine. A considerable saving in time and labor is thereby accomplished since with the exception of the brief time required to change shuttles the machine is in continual operation, since the work can be accurately centered in the idle shuttle during such operation, and since the shuttle being portable can be taken to a loading or centering fixture to facilitate loading thereof. These shuttles are also adapted to handle a plurality of work blanks at one time thereby multiplying the output or capacity of the machine tool.

The primary object of the present invention is to provide a novel shuttle of the above type which is extremely simple in construction and operation, inexpensive, and adapted to handle a large variety of work blanks.

Further objects and advantages will become apparent as the description proceeds.

In the accompanying drawing, Figure 1 is a sectional view of a chuck in which a double shuttle embodying the features of our invention is mounted.

Fig. 2 is a sectional view of a modified form of the shuttle.

Fig. 3 is a sectional view of a modified form of the shuttle adapted to hold but one work blank at a time.

Fig. 4 is an end view of the shuttle shown in Fig. 3.

Fig. 5 is a view in side elevation of a loading fixture for the shuttle.

While the invention is suceptible of various modifications and alternative constructions, we have shown in the drawing and will describe in detail the preferred embodiment thereof, but it is to be understood that we do not thereby intend to limit the invention to the particular form disclosed, but aim in the appended claims to cover all modifications and alternative constructions falling within the spirit and scope of the invention.

In its exemplary embodiment, the invention contemplates the provision of a chuck of suitable construction such as the one shown in Figure 1 in which the work holder or shuttle is adapted to be mounted. The chuck comprises a body 6 which is securely attached to a disk 7 on the forward end of a rotatable spindle 8, and which is formed with a pair of diametrically opposed and forwardly extending arms 9. The latter are bridged at their forward ends by an annular front plate 10 which is provided with a central bushing 11 having a flange 12 on its inner end and being concentric about the axis of rotation.

Slidably mounted in the body 6 for reciprocatory movement toward and from the bushing 11 are a plurality of spaced clamping members 13. These members are pressed forwardly by a plurality of coil springs 14, and are adapted to be retracted by a draw rod 15 extending through the spindle 8.

The shuttle mounted in the chuck comprises a body 16 in the form of a ring which is formed in opposite ends with taper bores 17 separated by a central radial flange 18 on its inner periphery. The forward end of the body is formed with a centering notch 19 adapted to fit the flange 12 on the bushing 11 to locate the shuttle in the chuck, and the rear end thereof is adapted to be suitably engaged by the clamping members 13 to hold the shuttle securely in centered position.

A pair of split bushings or clamping sleeves 20 are slidably mounted one in each end of said body, and are formed with taper or wedge peripheral surfaces adapted to coact with the corresponding surfaces of the bores 17. Each sleeve is adapted to receive a work blank A which is squared up against the flange 18. The outer ends of the sleeves 20 are provided with peripheral flanges 21 spaced from the ends of the body 16 to provide annular spaces for the insertion of a tool to separate said sleeves from said body.

Referring to Fig. 2, a shuttle of similar construction is illustrated. This shuttle is distinguished from the one shown in Fig. 1 by the provision instead of the peripheral flanges 21 of a plurality of radial bores opening centrally through the walls of the body to facilitate the removal of the sleeves 20.

The shuttles can be constructed to hold different numbers of blanks A at one time. Thus in Figs. 3 and 4, we have illustrated a shuttle designed to hold a single blank. In this shuttle, the body is provided with a handle 23, and the sleeve 20 extends completely through the body. A plurality of spaced radial extensions 24 constituting a flange are formed on one end of the sleeve 20 to square up the end of the work blank. In the present instance, the sleeve is designed to hold a worm B, and more specifically is formed on its inner periphery with sections of teeth 25 adapted to mesh with the threads on the worm at spaced points about the periphery of the latter.

Referring to Fig. 5, a suitable loading fixture for the shuttles is illustrated. This fixture comprises a base 26 on which a block 27 adapted to receive one end of a shuttle is located. Extending up from the base at opposite sides of the block 27 are a pair of arms 28 which meet at a vertical journal or guide 29 directly over the block. A ram 30 is mounted in said guide for movement toward and from the block, and is normally pressed upwardly by a coil spring 31. The spring is mounted on the ram between the guide 29 and a cross arm 32. Connected to opposite ends of the cross arm 32 for lowering the ram 30 are two flexible cables 33. In loading the shuttle, it is placed on the block and the ram is lowered. This forces the sleeves 20 inwardly along the taper bores 17 of the body, and thereby causes a peripheral contraction of the sleeves into clamping engagement with the work blanks. To unload the shuttle shown in Fig. 3, it is mounted in the loading fixture in a reversed position with the smallest end of the sleeve 20 uppermost.

We claim as our invention:

1. A work holding shuttle having, in combination, a body formed with a taper bore and with a radial flange at one end of said bore for backing up the work, a centering notch on the exterior of said body concentric with said bore, whereby the shuttle may be centered in a chuck, a split sleeve slidably mounted in said bore and having a wedge engagement therewith, and a flange formed on the outer end of said sleeve and overlying the adjacent end of said body.

2. A work holding shuttle comprising a body member having a bore, a split sleeve member mounted in said bore and having a wedge engagement therewith, said sleeve member being adapted to receive a work blank, a circular centering flange provided by said body member for centering said shuttle in a chuck, a flange on one of said members for backing up the work blank, and means formed on one of said members for facilitating the separation of said members.

In testimony whereof we have hereunto affixed our signatures.

HERBERT E. KEMPTON.
KEITH F. GALLIMORE.
RAYMOND M. WOYTYCH.